United States Patent
Quer et al.

(10) Patent No.: US 7,124,633 B2
(45) Date of Patent: Oct. 24, 2006

(54) VIBRATING BEAM ACCELEROMETER

(75) Inventors: Régis Quer, Guilherand (FR); Jérôme Inglese, Guilherand Granges (FR); Claude Rougeot, Lyons (FR)

(73) Assignee: THALES, Neuilly sur Seine (FR)

( * ) Notice: Subject to any disclaimer, the term of this patent is extended or adjusted under 35 U.S.C. 154(b) by 0 days.

(21) Appl. No.: 10/537,297

(22) PCT Filed: Dec. 1, 2003

(86) PCT No.: PCT/EP03/50915

§ 371 (c)(1),
(2), (4) Date: Jun. 2, 2005

(87) PCT Pub. No.: WO2004/053503

PCT Pub. Date: Jun. 24, 2004

(65) Prior Publication Data

US 2006/0096378 A1    May 11, 2006

(30) Foreign Application Priority Data

Dec. 10, 2002   (FR)   .................................. 02 15599

(51) Int. Cl.
*G01P 15/10* (2006.01)
*G01L 1/10* (2006.01)

(52) U.S. Cl. .............................. 73/514.15; 73/514.29; 73/514.38

(58) Field of Classification Search ............. 73/514.29, 73/514.16, 514.36, 514.38, 514.01, 514.15, 73/514.34, 514.35, 504.12, 504.16

See application file for complete search history.

(56) References Cited

U.S. PATENT DOCUMENTS

| | | | | |
|---|---|---|---|---|
| 5,095,764 A | * | 3/1992 | Saner | ...................... 73/862.59 |
| 5,969,249 A | * | 10/1999 | Roessig et al. | .......... 73/514.15 |
| 5,969,250 A | * | 10/1999 | Greiff | ...................... 73/514.38 |
| 6,901,029 B1 | | 5/2005 | Raillon et al. | |

* cited by examiner

*Primary Examiner*—Helen C. Kwok
(74) *Attorney, Agent, or Firm*—Lowe Hauptman & Berner LLP

(57) ABSTRACT

Accelerometer micromachined in a plane plate comprising a base, and at least one measurement cell including a moveable seismic mass connected to the base and capable of moving translationally along the sensitive y axis of the accelerometer under the effect of an acceleration γ along this y axis, a resonator cell that comprises a resonator that can vibrate and be subjected to a tensile or compressive force depending on the direction of the acceleration γ and is placed symmetrically with respect to an axis of symmetry S of the structure, this axis S being parallel to the y axis and passing through the center of gravity of the seismic mass, the measurement cell furthermore including amplification means for amplifying the acceleration force, which means comprise at least one anchoring foot for anchoring to the base, two rigid terminations of the resonator cell and two pairs of micromachined arms symmetrical with respect to the axis S, each pair comprising a first arm connecting a termination to the seismic mass, and a second arm connecting the same termination to the anchoring foot, the angle α between the Ox axis and the first arm being small enough for the tensile or compressive force exerted on the resonator to be greater than the acceleration force exerted on the seismic mass.

19 Claims, 8 Drawing Sheets

VIBRATING BEAM ACCELEROMETER

CROSS-REFERENCE TO RELATED APPLICATIONS

The present Application is based on International Application No. PCT/EP2003/050915, filed on Dec. 1, 2003, which in turn corresponds to FR 02/15599 filed on Dec. 10, 2002, and priority is hereby claimed under 35 USC §119 based on these applications. Each of these applications are hereby incorporated by reference in their entirety into the present application.

FIELD OF THE INVENTION

The field of the invention is that of flat monolithic accelerometers. The flat structure allows simple and inexpensive fabrication, especially by chemical etching processes. In addition, the fabrication may be collective.

BACKGROUND OF THE INVENTION

A flat monolithic accelerometer conventionally comprises a body having a base and two measurement cells providing a differential measurement. A measurement cell typically comprises a seismic mass connected, on one side, to the base and, on the other side, to a force sensor, which is itself also connected to the base. When the accelerometer is subjected to an acceleration along the sensitive axis, which is the axis of the acceleration to be measured, the seismic mass is subjected to an inertial force, which is amplified and transmitted to the force sensor by means for amplifying the force or displacement transmitted.

In patent application FR 0 102 573, the amplification is obtained by means of an arm called a lever arm, which extends the seismic mass. The displacement of the seismic mass is transmitted to the force sensor by means of this lever arm. More precisely, the arm is connected to the base via an articulation, allowing the mass to rotate about an axis perpendicular to the sensitive axis of the accelerometer, and is connected to the force sensor via a hinge. When the accelerometer is subjected to an acceleration along the sensitive axis, the seismic mass is subjected to a force which rotates it about the articulation, as therefore that part of the lever arm which is connected to the force sensor.

The force sensor is a vibrating-beam sensor. The vibrating beam is connected to electrodes that allow it to vibrate at its resonant frequency and to a circuit for measuring the variation in its resonant frequency.

The measurement cells are mounted so that when the accelerometer is subjected to an acceleration along the sensitive axis one of the beams is subjected to a tensile force, the other beam being subjected to a compressive force of the same value, these tensile or compressive forces varying the resonant frequency of the beam measured by the measurement circuit. Thus, a differential measurement is obtained, which makes it possible in particular to overcome certain nonlinear effects.

The variation in the resonant frequency is directly related to the displacement of the force sensor induced by the rotation of that part of the lever arm which is connected to the force sensor. The end of the beam also undergoes a certain rotation, which often proves to be problematic, especially in the case of a tuning fork (i.e. rotation of two beams that form a tuning fork) in which the force transmitted to the two beams is not exactly identical.

In addition, the quality of machining of the hinges and articulations is of paramount importance, and constitutes one of the industrial limitations of this accelerometer.

Furthermore, since the displacement is proportional to the length of the lever arm, the overall size is greater the higher the desired amplification ratio to be obtained.

An important object of the invention is therefore to propose an accelerometer that does not have a rotating lever arm as amplification means but comprises, in general, a resonator that may be a vibrating beam.

SUMMARY OF THE INVENTION

To achieve this object, the invention proposes an accelerometer micromachined in a plane plate comprising a base, and at least one measurement cell including a moveable seismic mass connected to the base and capable of moving translationally along the sensitive Oy axis of the accelerometer under the effect of an acceleration $\gamma$ along this Oy axis, a resonator cell comprising a resonator that can vibrate and be subjected to a tensile or compressive force depending on the direction of acceleration $\gamma$ and is placed symmetrically with respect to an axis of symmetry S of the structure, this axis S being parallel to the Oy axis and passing through the center of gravity of the seismic mass, the measurement cell furthermore including amplification means for amplifying the acceleration force that generates the translation, which means comprise at least one anchoring foot for anchoring to the base, two rigid terminations of the resonator cell and two pairs of micromachined arms, the pairs being symmetrical with respect to the axis S, each pair comprising a first arm connecting a first point of attachment to a termination and a second point of attachment to the seismic mass, and a second arm connecting a third point of attachment to the same termination and a fourth point of attachment to the anchoring foot, the angle $\alpha$ between the Ox axis perpendicular to the Oy axis and the line joining the first and second points of attachment being symmetrical with respect to the axis connecting the terminations via their mid-point, of the angle between the Ox axis and the line joining the third and fourth points of attachment and sufficiently small for the tensile or compressive force exerted on the resonator to be greater than the acceleration force exerted on the seismic mass.

Because of the symmetry of this structure, the displacements of the seismic mass, of the embedding terminations and of the resonator are perfectly axial. In addition, the performance of this structure, i.e. the amplification ratio obtained, is simply determined by the angle $\alpha$; the geometry of the seismic mass, the center of gravity of which lies on the axis of symmetry S, does not play a role in the performance of the accelerometer.

According to a first embodiment, the rigid terminations of the resonator are embedding elements for embedding the ends of the resonator; the resonator cell simply comprises the resonator itself.

According to another embodiment, the resonator cell comprises two rigid embedding elements for embedding the ends of the resonator and two pairs of secondary micromachined arms, these pairs being symmetrical with respect to the axis S, each pair comprising a first secondary arm connecting a first point of attachment to an embedding element and a second point of attachment to a termination of the cell, and a second secondary arm connecting a third point of attachment to the other embedding element and a fourth point of attachment to the same termination of the cell, the angle $\beta$ between the Oy axis and the line joining the first and second points of attachment being symmetrical with respect to the axis passing through the mid-points of the embedding elements, of the angle between the Oy axis and the line joining the third and fourth points of attachment and low enough for the tensile or compressive force exerted on the resonator to be greater than the acceleration force exerted on the seismic mass.

This embodiment corresponds to a cascade configuration, with the aim of multiplying the amplification ratio of the accelerometer.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

BRIEF DESCRIPTION OF THE DRAWINGS

Other features and advantages of the invention will become apparent on reading the detailed description that follows, given by way of nonlimiting example and with reference to the appended drawings in which:

in FIG. 2, the pairs of arms are located on the other side of the resonator with respect to the terminations;

in FIG. 3, they are located on the same side as the resonator;

Figure 4:
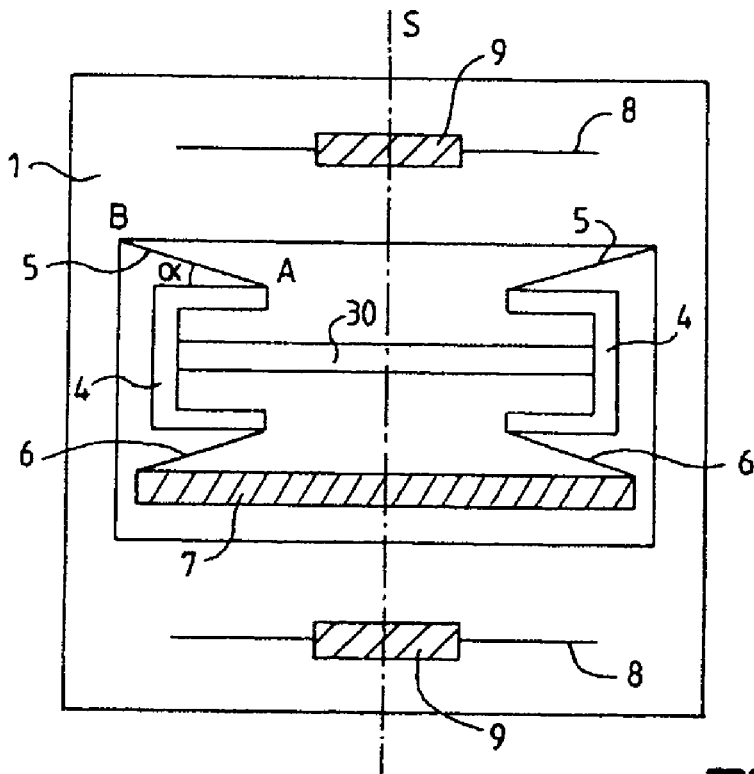
Figure 6:
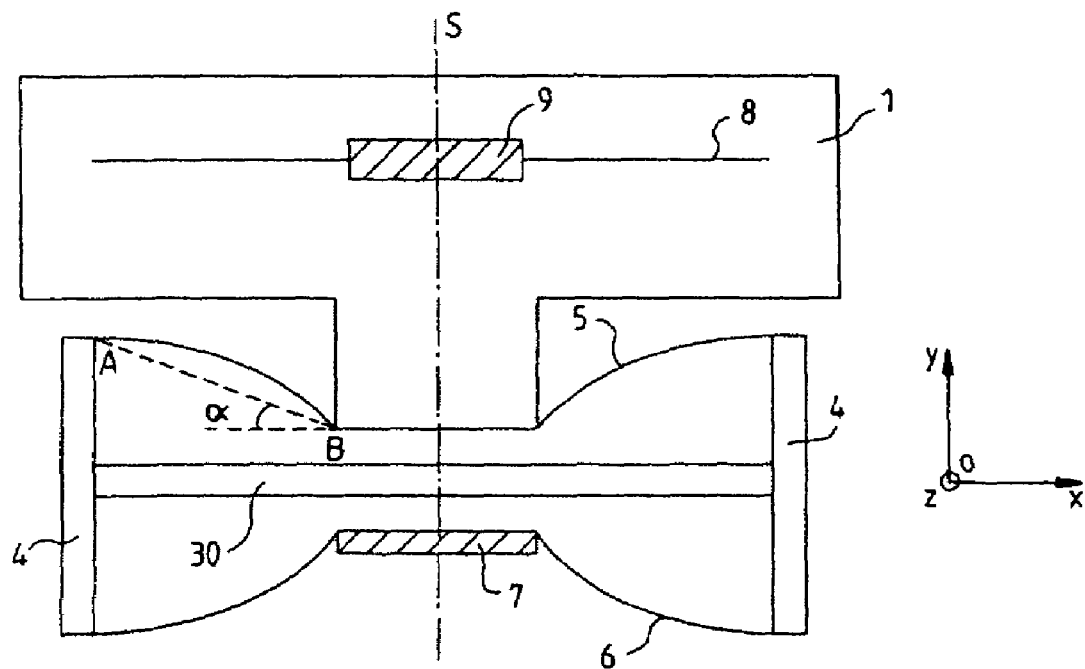
Figure 7:
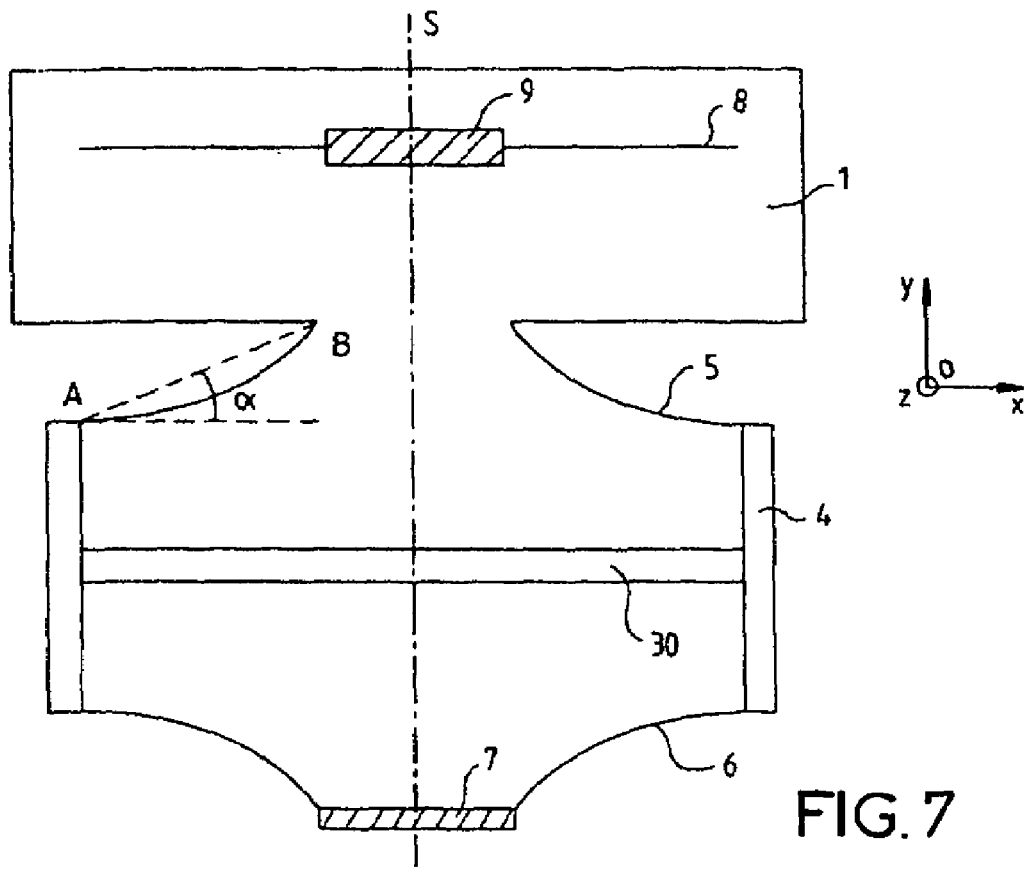
Figure 8:
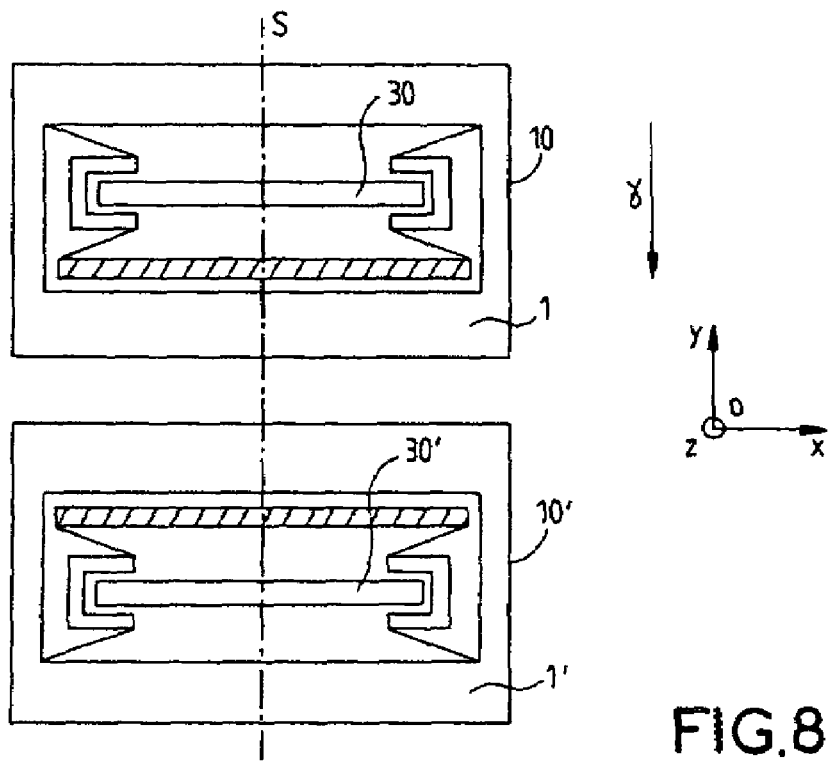
Figure 9:
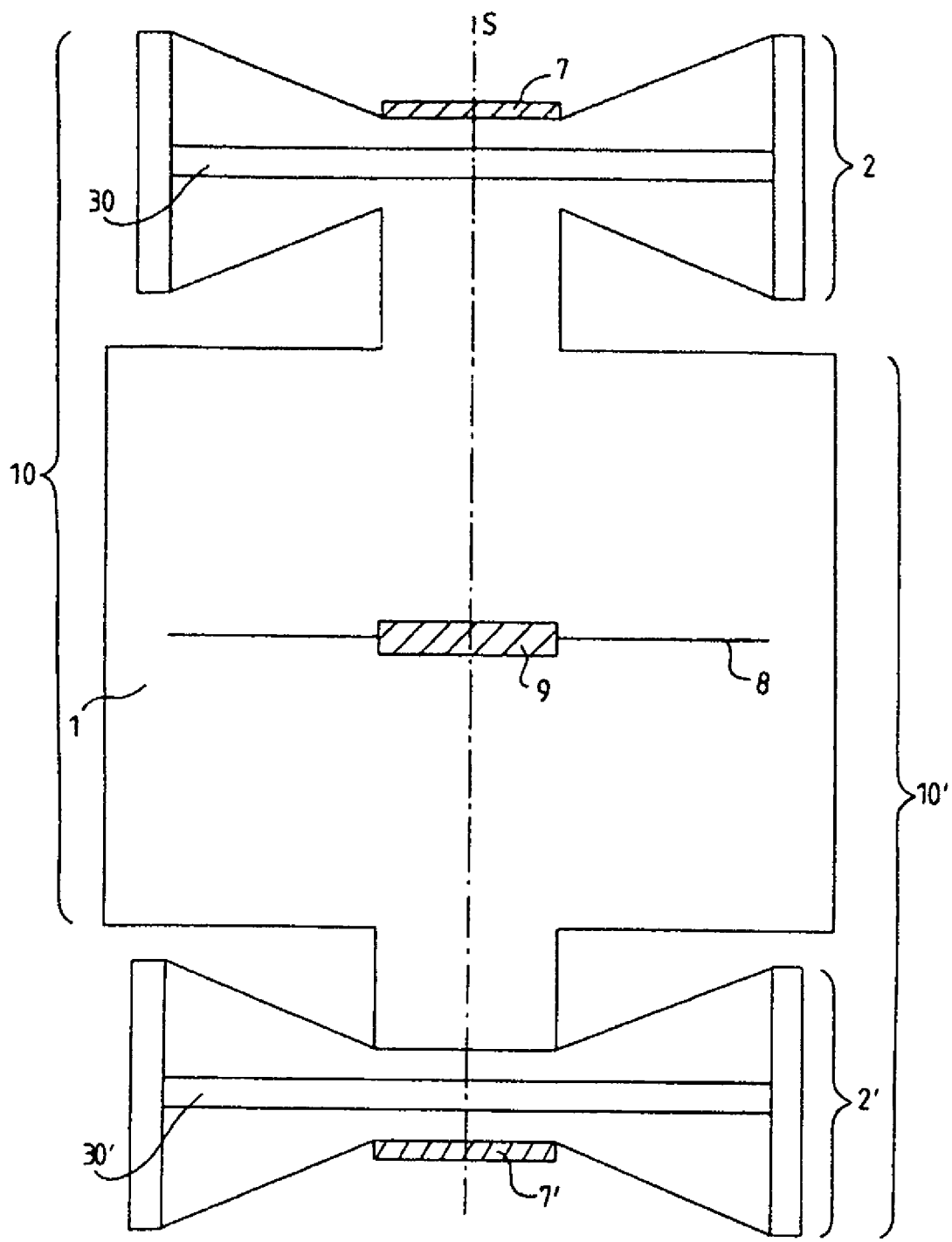
Figure 9:
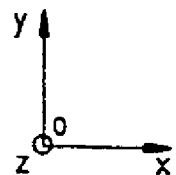
Figure 10:
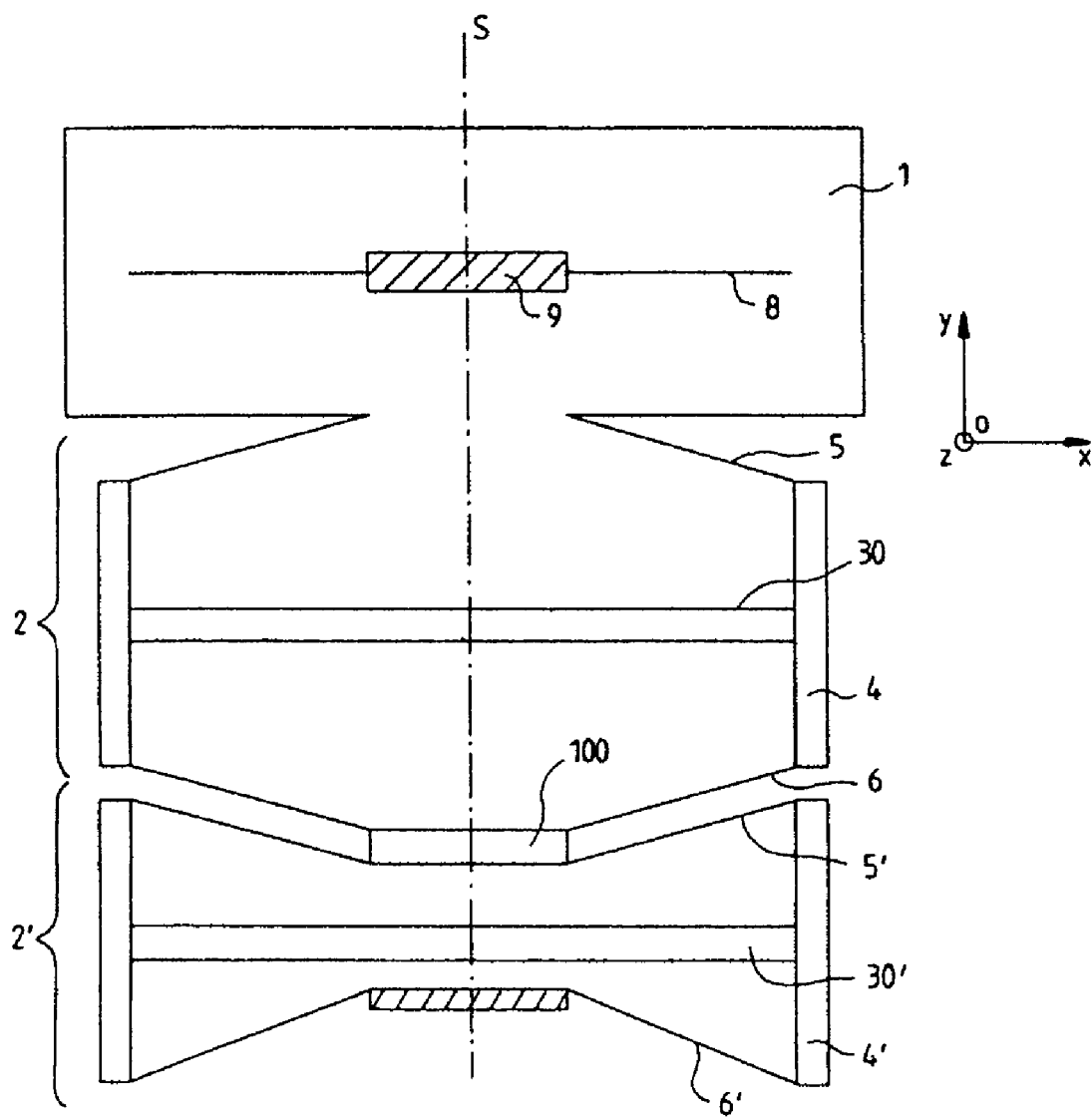
Figure 11:
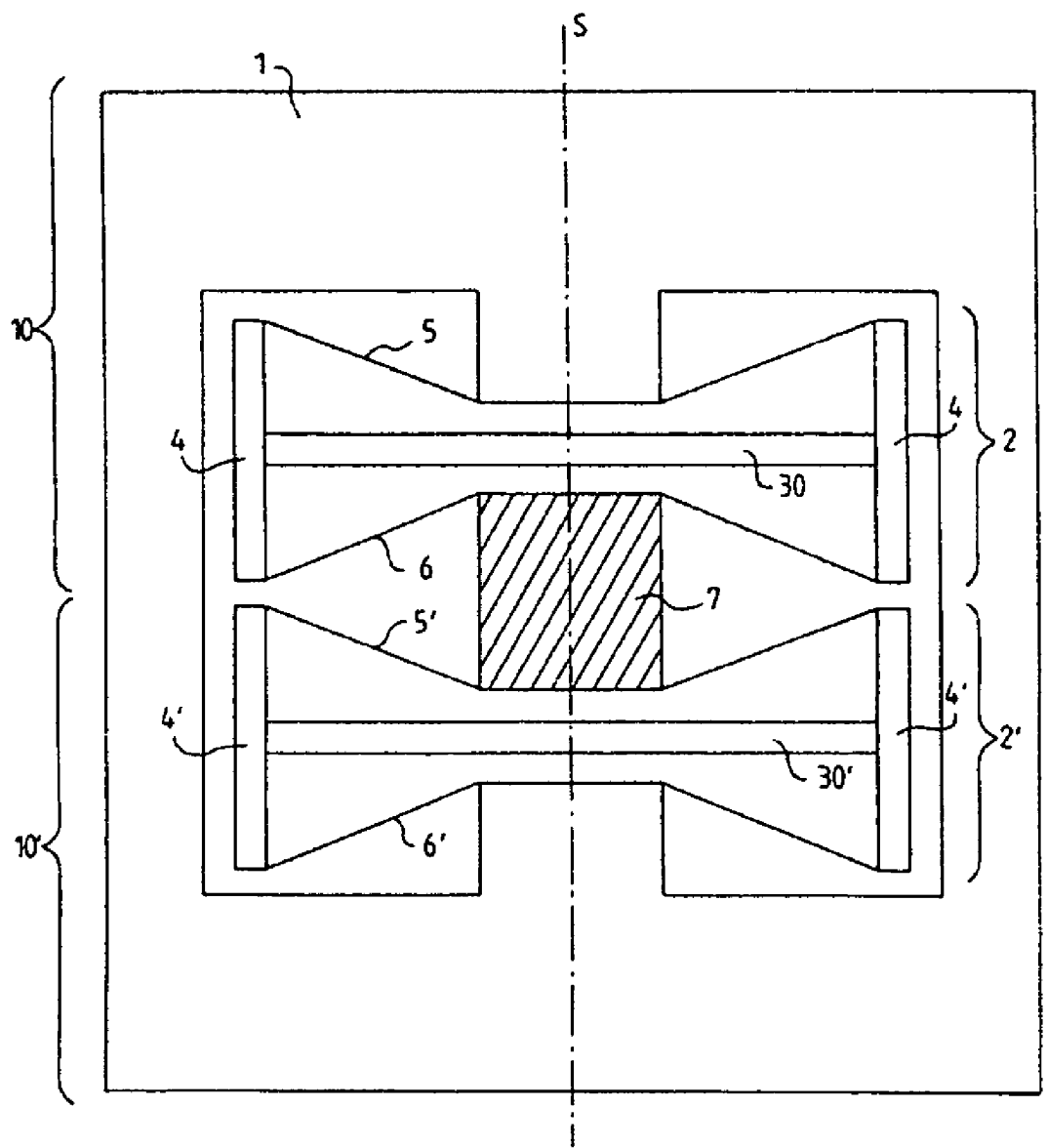
Figure 12:
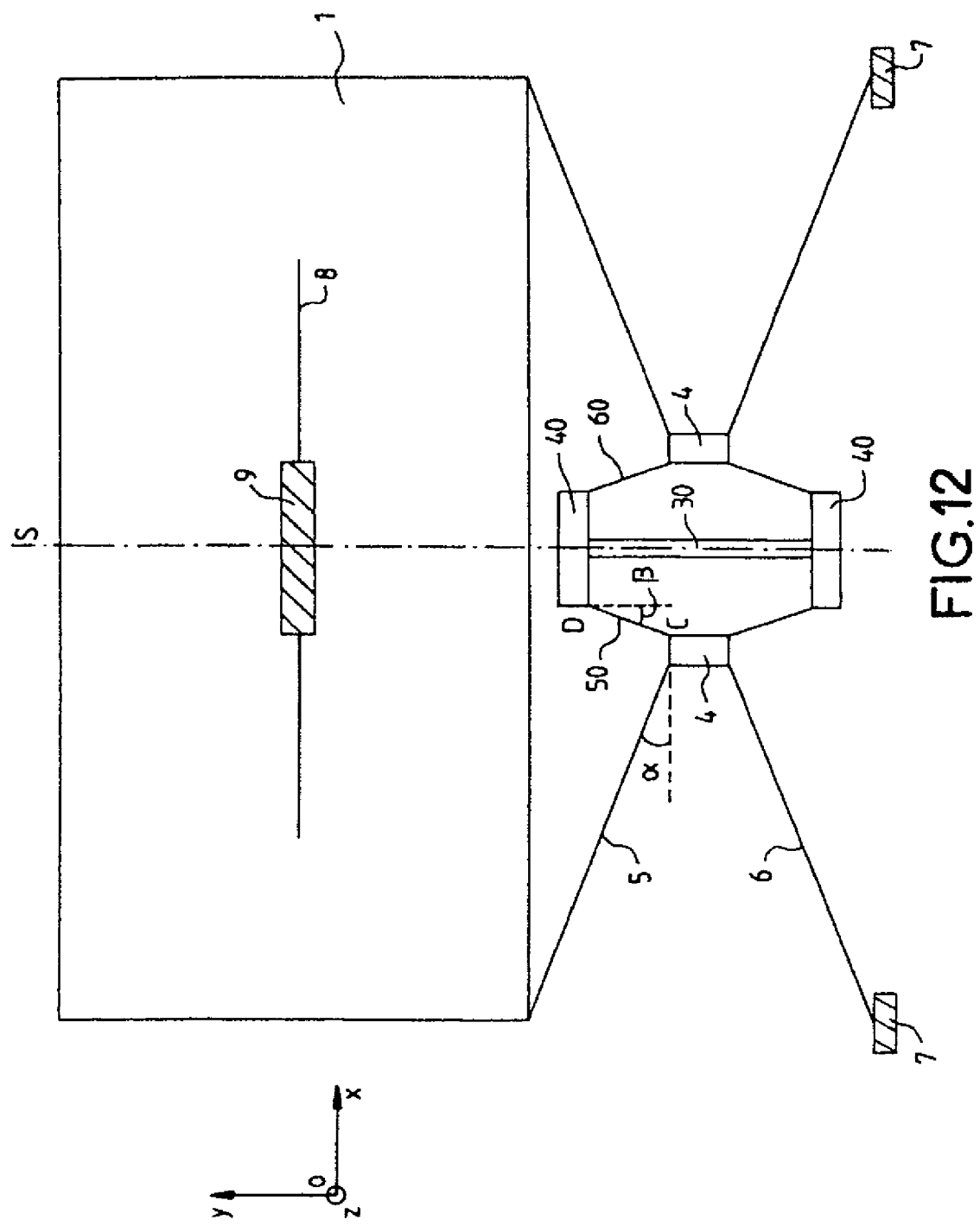

and in FIG. 4 the terminations are U-shaped;

FIG. 6 shows schematically an embodiment of a measurement cell structure for an accelerometer according to the invention, in which the arms are curved with a concave shape;

FIG. 7 shows schematically an embodiment of a measurement cell structure for an accelerometer according to the invention, in which the arms are curved with a convex shape;

FIG. 8 shows schematically an example of an accelerometer according to the invention, comprising two measurement cells;

FIG. 9 shows schematically an example of an accelerometer according to the invention, comprising two measurement cells that share the same seismic mass located between their amplification means;

FIG. 10 shows schematically an example of an accelerometer according to the invention, comprising two measurement cells that share the same seismic mass located on one side of the accelerometer;

FIG. 11 shows schematically an example of an accelerometer according to the invention, comprising two measurement cells that share the same seismic mass located around their amplification means; and FIG. 12 shows schematically an example of an accelerometer according to the invention, in a cascade configuration.

DETAILED DESCRIPTION OF THE INVENTION

Hereafter, the example of a two-beam resonator forming a tuning fork will be given, these beams being made to vibrate in phase opposition by means of two electrodes. It is this tuning fork configuration that is shown in the figures. A resonator comprising one vibrating beam or several vibrating beams or a torsion bar may just as well have been used.

The vibrating-beam accelerometer according to the invention preferably comprises two measurement cells that can be produced by machining a silicon-on-insulator (SOI) or quartz substrate, or a substrate of another material, but other methods are also possible.

A silicon-on-insulator substrate consists of a stationary monolithic silicon substrate a few hundred microns (for example 450 µm) in thickness constituting the base of the accelerometer, which has on its front face a thin layer of silicon a few microns (for example 2 µm) in thickness, which is itself covered with a single-crystal silicon layer a few tens of microns (for example 60 µm) in thickness. The machining consists in etching the single-crystal silicon via its front face, until the oxide layer is reached, with a selective etchant that etches the silicon without significantly etching the oxide. The etching is stopped when the oxide layer is bared. This oxide layer may itself be removed by selective etching with another etchant so as to preserve only the silicon surface layer. The desired surface features may thus be etched into this layer by means of photoetching techniques or of another technique used in microelectronics in order in this way to obtain the desired moveable plane structure.

Hereafter, a coordinate system O,x,y,z shown in the figures will be used, in which the plane of the figures is the O,x,y plane, the Oz axis representing the direction perpendicular to this plane. The axis Ox (respectively Oy, Oz) denotes an axis parallel to the Ox axis (respectively Oy, Oz) shown in the figures. From one figure to another, the same elements will be denoted by the same references.

Figure 1:
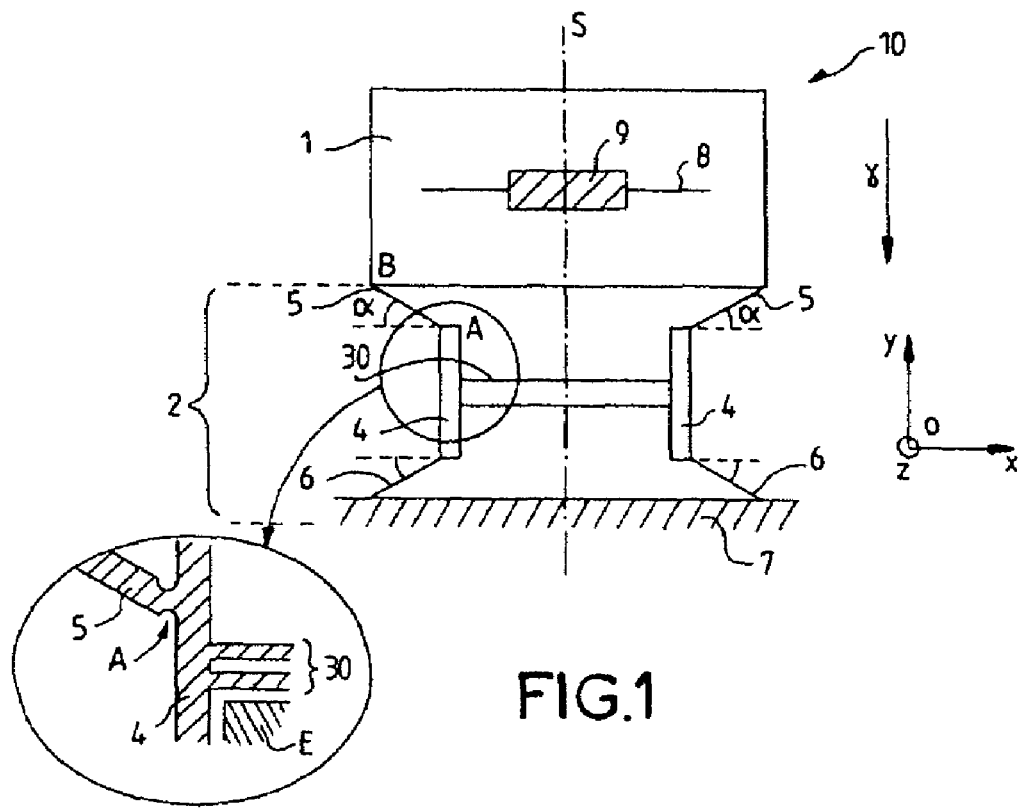
FIG. 1 shows schematically a first embodiment of a measurement cell structure for an accelerometer according to the invention, in which the seismic mass is located on one side of the amplification means, the pairs of arms being placed like a "butterfly"

The moveable plane structure 10 of a measurement cell of the accelerometer, shown schematically in FIG. 1, comprises a moveable seismic mass 1 that can move translationally along the sensitive axis of the accelerometer, denoted by the axis Oy, which is the axis of the acceleration γ to be measured, and amplification means 2 for amplifying the force that generates this translation, said force being measured by means of two vibrating beams 30 placed along an Ox axis perpendicular to the Oy axis, which are subjected to a tensile or a compressive force depending on the direction of the acceleration. The beams are placed symmetrically with respect to an axis of symmetry S of the structure, this axis of symmetry being parallel to the Oy axis and passing through the center of gravity of the mass—the geometry of the seismic mass then plays no role in the performance of the accelerometer.

The vibrating beams 30 are embedded at each end in a rigid termination 4. Each of these terminations 4 comprises a pair of micromachined arms. The two pairs are symmetrical with respect to the axis of symmetry S. A first micromachined arm 5 connects the termination 4 to the seismic mass 1. In order for the termination 4 not to "float" with respect to the base, that is to say with respect to the stationary monolithic silicon substrate, a second micromachined arm 6, symmetrical with the first arm with respect to the axis of the beam, connects the termination 4 to an anchoring foot 7 fixed to the base. These arms 5 and 6 are connected, respectively, to the seismic mass 1, to the termination 4 and to the anchoring foot 7, by points of attachment. The thickness of an arm 5 or 6 can vary over its length.

Also shown schematically in FIG. 1 is a detail of part of the amplification means. The first arm 5 is articulated to the termination 4 via a point of attachment A. Part of an electrode E is also shown. The two vibrating beams 30 are embedded in the termination 4 so far as they are formed, for example, by etching the same layer of material. The hatching represents the material, for example single-crystal silicon in the case of a cell produced by machining an SOI. As indicated above, the surface features, such as the arms 5, the point of attachment A, the termination 4, the beams 30 and the electrode E, have been obtained by etching the single-crystal silicon and then by etching the oxide layer.

The angle α made between the Ox axis and the line joining the points of attachment A and B of the first arm 5 which, because of the symmetry of the arms 5 and 6 with respect to the axis connecting the terminations via their mid-point, is symmetrical with the angle made between the Ox axis and the line joining the points of attachment of the second arm 6. This angle α is small enough for the tensile or compressive force exerted on the beam 30 to be greater than the acceleration force exerted on the seismic mass 1.

These amplification means 2 furthermore allow the space around the vibrating beams 30 to be cleared, especially in order to place the electrodes in the case of electrostatic excitation. It will be recalled that the vibrating beams are set into vibration at their resonant frequency by means of electrodes placed facing these beams, or directly on the beams, depending on whether there is electrostatic or piezoelectric excitation.

The seismic mass 1 is intrinsically guided translationally along the Oy axis owing to the symmetry of the structure. In order to preserve only this degree of freedom along Oy, the structure along Ox and Oz may optionally be further stiffened by guiding arms 8 oriented along the Ox axis, one end of which is fixed to the seismic mass 1 and the other to a part 9 fixed to the base.

The force that generates the displacement of the seismic mass 1 along the Oy axis is transmitted via the first arms 5 to each of the terminations 4 which, depending on the direction of displacement, move closer together or further apart along the Ox axis, thus causing a tensile or compressive force on the vibrating beams 30. Since the structure 10 is symmetrical with respect to the axis S, and as regards the arms with respect to the axis of the beams, the displacements of the seismic mass 1, of the terminations 4 and of the beam 30 are perfectly axial. Thus, when the beams 30 form a tuning fork, the tensile or compressive forces are exerted in the same way on each of the beams of the tuning fork.

The performance of this structure, that is to say the amplification coefficient obtained, is simply determined by this angle α.

When the seismic mass 1 is subject to an acceleration γ along the −Oy direction, the inertial force Mγ is amplified and transmitted by the amplification means 2 to the vibrating beams 30. The compressive force (which may be a tensile force for other configurations) in these beams then has an amplitude of Mγ/tanα. The ratio of the displacement of the seismic mass 1 along −Oy to the displacement along Ox of a termination is approximately equal to 2/tan α. Depending on its use, this structure may constitute a displacement or force amplification system.

According to a preferred embodiment, the seismic mass 1 surrounds the vibrating-beam amplification means 2, as shown in FIGS. 2 to 5. Such a configuration allows a more compact structure to be obtained.

The arms 5, 6 may be arranged in various ways.

Figure 2:
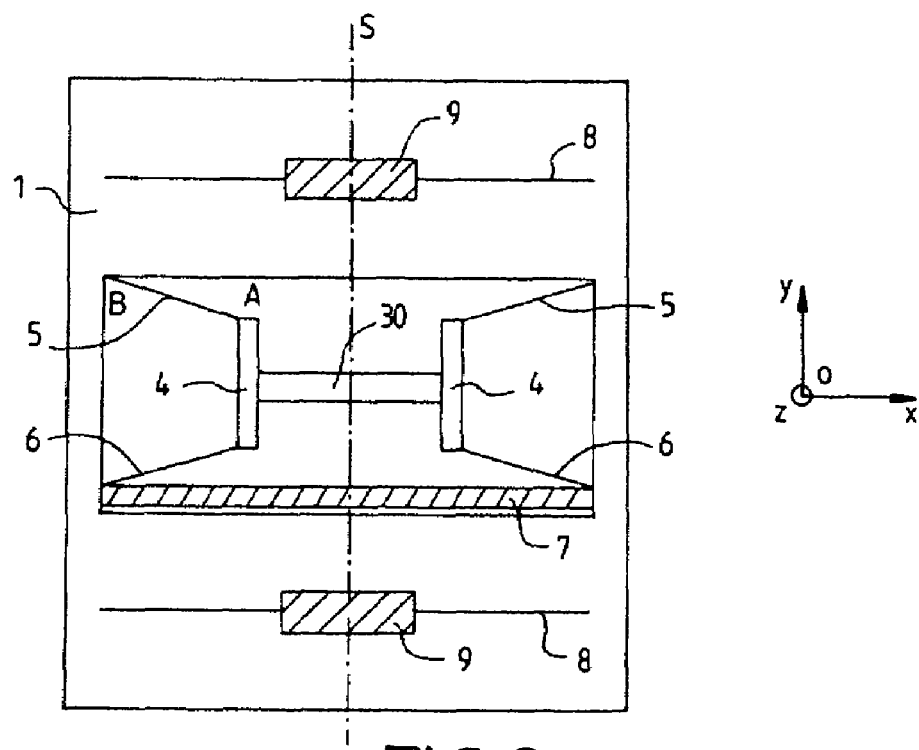
FIGS. 2 to 5 show schematically a second embodiment of a measurement cell structure for an accelerometer according to the invention, in which the seismic mass surrounds the amplification means, the pairs of arms being placed like a "butterfly" in FIGS. 2 to 4 and as a "jack" in FIG. 5.

They may be arranged in "butterfly" (or in the form of an X), as shown in FIGS. 1, 2 and 4, this arrangement meaning that the first point of attachment A of the first arm 5 to the termination 4 is located closer to the axis of symmetry S than its second point of attachment B to the seismic mass 1. In this case, a displacement of the seismic mass 1 toward the beams 30 then generates a compressive force in the beams.

Figure 3:
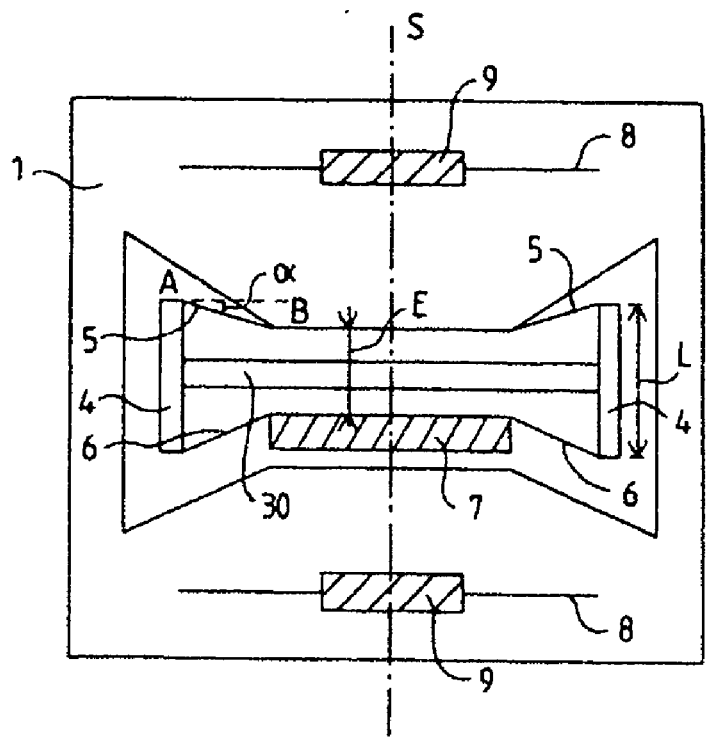

As shown in FIG. 2, the arms 5 and 6 are located on the other side of the beams from the terminations. They may also be located on the same side as the beams, when the length L of the terminations 4 is greater than the distance E between the seismic mass 1 and the anchoring foot 7, as shown in FIG. 3.

Another version of this butterfly arrangement is shown in FIG. 4, in which each termination 4 then has a U-shape.

Figure 5:
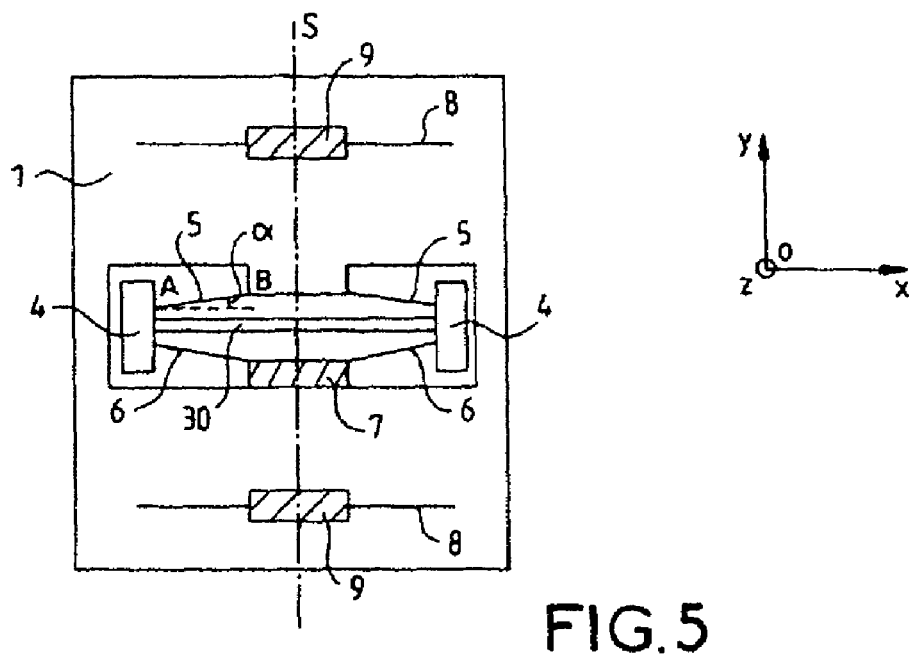

The arms 5, 6 may also be arranged like a "jack" as shown in FIG. 5, this arrangement meaning that the first point of attachment A of the first arm 5 is located further away from the axis of symmetry S than its second point of attachment B. A displacement of the seismic mass 1 toward the beam 3 then generates a tensile force in the beams.

In these figures, the arms have been shown as straight.

They may be curved with a concave shape or a convex shape, as shown in FIGS. 6 and 7, respectively, which illustrate an arrangement of the arms like a "jack", corresponding to that of FIGS. 3 and 5, respectively.

Of course, the accelerometer preferably comprises two moveable structures 10 and 10' as described, these being placed with respect to each other so as to obtain a differential measurement of the acceleration. An example of this double structure is shown in FIG. 8, in which each structure 10 and 10' adopts the configuration with U-shaped terminations of FIG. 4. Any other configuration may be used. Under the effect of an acceleration in the opposite direction to the Oy axis, the vibrating beams 30 of the structure 10 are subjected to a compressive force, while the vibrating beams 30' of the structure 10' are subjected to a tensile force.

In one particular embodiment of the invention, the double structure 10 and 10' comprises only one seismic mass, common to the two measurement cells, instead of comprising two seismic masses 1 and 1'. The main benefit of such an accelerometer is that the same mass/spring resonant frequency is obtained for both cells. A good approximation of the calculation of this frequency is $$f = \frac{\tan\alpha}{2\pi}\sqrt{\frac{k_x}{m}},$$

where m is the seismic mass and $k_x$ is the stiffness of the resonator along the Ox axis. If these are separate frequencies, dispersions in the frequency may be observed from one cell to another.

The seismic mass may or may not be located between the two amplification means 2, 2'. It may also surround the two amplification means 2, 2'. The pairs of arms may or may not be placed in the same way from one cell to another.

FIG. 9 shows an accelerometer comprising only one seismic mass 1 located at the mid-point of the two identical amplification means 2, 2', the arms 5, 6, 5' and 6' of which are arranged like a "jack". In this case, under the effect of an acceleration in the direction opposite to the Oy axis, the vibrating beams 30 are subjected to a tensile force whereas the other vibrating beams 30' are subjected to a compressive force.

The accelerometer in FIG. 10 comprises only one seismic mass 1 located on one side of the accelerometer, and first amplification means 2, the arms 5, 6 of which are placed like a "jack", whereas the arms 5', 6' of the other amplification means 2' are placed like a "butterfly". In this figure, the arms 6 are not connected to an anchoring foot but are connected to the arms 5' via a transmission element 100 for the displacement of the terminations 4 toward the terminations 4'. In this case, under the effect of an acceleration in the opposite direction to the Oy axis, the vibrating beams 30 are subjected to a tensile force, whereas the other vibrating beams 30' are subjected to a compressive force.

FIG. 11 illustrates the case in which the seismic mass surrounds both amplification means 2, 2', the arms 5, 6, 5' and 6' of which are placed like a "jack". In this case, under the effect of an acceleration in the opposite direction to the Oy axis, the vibrating beams 30 are subjected to a tensile force whereas the other vibrating beams 30' are subjected to a compressive force.

An accelerometer having the double structure as shown in FIG. 8 was produced with a resonant frequency of the tuning fork of about 30 kHz for a zero acceleration, a change in resonant frequency of the vibrating beams, measured by the measurement circuit, of about 3 kHz, and a displacement of the seismic mass along the y axis of about 10 nanometers per g, g being the Earth's acceleration, equal to 9.81 m/s². By neglecting the stiffness of the amplification means along the Ox axis relative to the stiffness of the beam, the following amplification ratios 1/tan α at the beams as a function of angle α are obtained:

| | Angle α | | | | | |
|---|---|---|---|---|---|---|
| | 1° | 2° | 3° | 4° | 5° | 10° |
| Force amplification | 57 | 29 | 19 | 14 | 11 | 6 |

According to another embodiment, the measurement cell structure may be used in cascade in order to multiply the amplification ratios.

FIG. 12 illustrates the case in which two amplification stages are placed in cascade, while still keeping a space for the electrodes. The vibrating beams 30 shown in FIGS. 1 to 11 are then replaced more generally with a vibrating-beam cell which is also placed between the rigid terminations 4.

In the case in FIG. 12, the vibrating-beam cell comprises two vibrating beams 30 placed on the axis of symmetry S (and therefore symmetric with respect to this axis S), said beams being embedded at each end in a rigid embedding element 40. Each of these embedding elements 40 comprises a pair of secondary micromachined arms. The two pairs are symmetrical with respect to the axis of symmetry S. A first secondary arm 50 connects the embedding element 40 to a first termination 4 of the cell. A second secondary arm 60, symmetrical with the first arm with respect to the axis of the beams 30, connects the embedding element 40 to the second termination 4 of the cell. These arms 50 and 60 are connected to the embedding element 40 and to the termination 4 of the cell, respectively, via points of attachment. The thickness of a secondary arm 50 or 60 may vary over its length.

The angle β made between the axis parallel to the axis of the beam, in this case the Oy axis, and the line joining the points of attachment C and D of the first arm 50 which, because of the symmetry of the arms 50 and 60 with respect to the axis of the beams 30, is symmetrical with the angle made between the axis parallel to the axis of the beams and the line joining the points of attachment of the second arm 60, is small enough for the tensile or compressive force exerted on the beams 30 to be greater than the acceleration force exerted on the seismic mass 1. This cascade arrangement, which results in an increase in the amplification ratio, makes it possible to obtain a tensile or compressive force greater than that obtained with a noncascade configuration.

Finally, the vibrating beams described in relation to FIGS. 1 to 11 are one particular case of a vibrating-beam cell. In this particular case, the rigid terminations 4 of the vibrating-beam cell coincide with the embedding elements 40.

Various examples of embodiments have been presented, but of course other configurations are possible.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

The invention claimed is:

1. An accelerometer micromachined in a plane plate having a base, comprising:

a measurement cell including a moveable seismic mass connected to the base and capable of moving translationally along a sensitive Oy axis;

of the accelerometer under the effect of an acceleration γ along this Oy axis, a resonator cell comprising a resonator that can vibrate and be subjected to a tensile or compressive force depending on the direction of acceleration γ and is placed symmetrically with respect to an axis of symmnetry S of a structure, the axis S being parallel to the Oy axis and passing through the center of gravity of the seismic mass;

the measmrement cell furthermore including amplification means for amplifying an acceleration force that generates the translation, which include an anchoring foot for anchoring to the base, two rigid terminations of the resonator cell and two pairs of micromachined arms, the pairs of arms being symmetrical with respect to the axis S, each pair comprising a first arm connecting a first point of attachment to a termination and a second point of attachment to the seismic mass, and a second arm connecting a third point of attachment to the same termination and a fourth point of attachment to the anchoring foot, an angle α between an Ox axis perpendicular to the Oy axis and the line joining the first and second points of attachment being symmetrical with respect to the axis connecting the terminations via mid-points of the first and second arms, of the angle between the Ox axis and the line joining the third and fourth points of attachment and sufficiently small for the tensile or compressive force exerted on the resonator to be greater than the acceleration force exerted on the seismic mass, wherein the resonator cell comprises two rigid embedding elements for embedding the ends of the resonator and two pairs of secondary micromachined arms, the secondary pairs of arms being symmetrical with respect to the axis S, each pair comprising a first secondary arm connecting a first point of attachment to an embedding element and a second point of attachment to a termination of the cell, and a second secondary arm connecting a third point of attachment to the other embedding element and a fourth point of attachment to the same termination of the cell, an angle β between the Oy axis and the line joining the first and second points of attachment being symmetrical with respect to the axis passing through the mid-points of the embedding elements, of the angle between the Oy axis and the line joining the third and fourth points of attachment and low enough for the tensile or compressive force exerted on the resonator to be greater than the acceleration force exerted on the seismic mass.

2. The accelerometer as claimed in claim 1, wherein the pairs of arms are straight or curved.

3. The accelerometer as claimed in claim 1, wherein the first point of attachment of the first arm is located further away from the axis of symmetry S than the second point of attachment of the first arm.

4. The accelerometer as claimed in claim 1 wherein the first point of attachment of the first arm is located closer to the axis of symmetry S than the second point of attachment of the first arm.

5. The accelerometer as claimed in claim 1, wherein the seismic mass surrounds the amplification means.

6. The accelerometer as claimed in claim 1, wherein the first and second arms have a thickness that can vary along a length thereof.

7. The accelerometer as claimed in claim 1, wherein the accelerometer furthermore includes guiding arms for guiding the seismic mass, wherein the guiding arms lie along the Ox axis and are connected to a part fixed to the base.

8. The accelerometer as claimed in claim 1, wherein comprising two measurement cells placed with respect to each other in such a way that, under the effect of an acceleration, the resonator of one measurement cell undergoes a tensile force while the resonator of the other measurement cell undergoes a compressive force.

9. The accelerometer as claimed in claim 8, wherein the two measurement cells have a common seismic mass.

10. The accelerometer as claimed in claim 8, wherein the pairs of arms are placed in the same way for each of the measurement cells.

11. The accelerometer as claimed in claim 8, wherein the pairs of arms are not placed in the same way for each of the measurement cells.

12. The accelerometer as claimed in claim 1, wherein the resonator comprises a vibrating beam, or two vibrating beams forming a tuning fork, or at least three vibrating beams or a torsion bar.

13. The accelerometer as claimed in claim 2, wherein the first point of attachment of the first arm is located further away from the axis of symmetry S than the second point of attachment of the first arm.

14. The accelerometer as claimed in claim 2, wherein the first point of attachment of the first arm is located closer to the axis of symmetry S than the second point of attachment of the first arm.

15. The accelerometer as claimed in claim 3, furthermore including guiding arms for guiding the seismic mass, wherein the guiding arms lie along the Ox axis and are connected to a part fixed to the base.

16. The accelerometer as claimed in claim 4, comprising two measurement cells placed with respect to each other in such a way that, under the effect of an acceleration, the resonator of one measurement cell undergoes a tensile force while the resonator of the other measurement cell undergoes a compressive force.

17. The accelerometer as claimed in claim 9, wherein the pairs of arms are placed in the same way for each of the measurement cells.

18. The accelerometer as claimed in claim 9, wherein the pairs of arms are not placed in the same way for each of the measurement cells.

19. The accelerometer as claimed in claim 8, wherein the resonator comprises a vibrating beam, or two vibrating beams forming a tuning fork, or at least three vibrating beams or a torsion bar.

* * * * *